US012748982B2

(12) United States Patent
Chen et al.

(10) Patent No.: US 12,748,982 B2
(45) Date of Patent: Sep. 29, 2026

(54) PERSONALIZED FEDERATED LEARNING VIA SHARABLE BASIS MODELS

(71) Applicant: Google LLC, Mountain View, CA (US)

(72) Inventors: Hong-You Chen, Hilliard, OH (US); Boqing Gong, Bellevue, WA (US); Mingda Zhang, Pittsburgh, PA (US); Hang Qi, Mountain View, CA (US); Xuhui Jia, Seattle, WA (US); Li Zhang, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 426 days.

(21) Appl. No.: 18/474,934

(22) Filed: Sep. 26, 2023

(65) Prior Publication Data

US 2024/0119307 A1 Apr. 11, 2024

Related U.S. Application Data

(60) Provisional application No. 63/410,473, filed on Sep. 27, 2022.

(51) Int. Cl.
*G06N 3/098* (2023.01)

(52) U.S. Cl.
CPC .................................... *G06N 3/098* (2023.01)

(58) Field of Classification Search
CPC ...................................................... G06N 3/098
See application file for complete search history.

(56) References Cited

PUBLICATIONS

Marfoq, Federated Multi-Task Learning under a Mixture of Distributions (Year: 2021).*
McMahan, Federated Learning of Deep Networks using Model Averaging (Year: 2016).*
Acar et al., "Federated Learning Based on Dynamic Regularization", International Conference on Learning Representations, May 3-7, 2021, Virtual, pp. 1-43.
Agarwal et al., "Federated Residual Learning", arXiv:2003.12880, Mar. 28, 2020, 34 pages.
Arivazhagan et al., "Federated Learning with Personalization Layers", arXiv:1912.00818, Dec. 2, 2019, 13 pages.
Beery et al., "The iWildCam 2020 Competition Dataset", arXiv:2004.10340, Apr. 21, 2020, 4 pages.
Bui et al., "Federated User Representation Learning", arXiv:1909.12535, Sep. 27, 2019, 10 pages.
(Continued)

*Primary Examiner* — Aryan E Weisenfeld
(74) *Attorney, Agent, or Firm* — DORITY & MANNING P.A.

(57) ABSTRACT

The embodiments are directed towards providing personalized federated learning (PFL) models via sharable federated basis models. A model architecture and learning algorithm for PFL models is disclosed. The embodiments learn a set of basis models, which can be combined layer by layer to form a personalized model for each client using specifically learned combination coefficients. The set of basis models are shared with each client of a set of the clients. Thus, the set of basis models is common to each client of the set of clients. However, each client may generate a unique PFL based on their specifically learned combination coefficients. The unique combination of coefficients for each client may be encoded in a separate personalized vector for each of the clients.

20 Claims, 5 Drawing Sheets

(56) References Cited

PUBLICATIONS

Caldas et al., "Leaf: A Benchmark for Federated Settings", arXiv:1812.01097, Dec. 3, 2018, 9 pages.
Changpinyo et al., "Synthesized Classifiers for Zero-Shot Learning", The Conference on Computer Vision and Pattern Recognition, Jun. 26-Jul. 1, 2016, Las Vegas, Nevada, United States, pp. 1-21.
Chen et al., "Federated Meta-Learning with Fast Convergence and Efficient Communication", arXiv:1802.07876, Feb. 22, 2018, 14 pages.
Chen et al., "FedBe: Making Bayesian Model Ensemble Applicable to Federated Learning", The International Conference on Learning Representations, May 3-7, 2021, Vienna, Austria, pp. 1-21.
Chen et al., "On Bridging Generic and Personalized Federated Learning For Image Classification", The International Conference on Learning Representations, Apr. 25-29, 2022, Virtual, pp. 1-32.
Chen et al., "Dynamic Convolution: Attention Over Convolution Kernels", The Institute of Electrical and Electronics Engineers/CVF Conference on Computer Vision and Pattern Recognition (CVPR), Jun. 2020, Seattle, Washington, United States, pp. 1-11.
Cheng et al., "Fine-Tuning is Fine in Federated Learning", arXiv:2108.07313v3, Feb. 18, 2022, 40 pages.
Collins et al., "Exploiting Shared Representations for Personalized Federated Learning", The International Conference on Machine Learning , Jul. 18-24, 2021, Virtual, pp. 1-39.
Cordts et al., "The Cityscapes Dataset for Semantic Urban Scene Understanding", The Conference on Computer Vision and Pattern Recognition, Jun. 26-Jul. 1, 2016, Las Vegas, Nevada, United States, pp. 1-29.
Corinzia et al., "Variational Federated Multi-Task Learning", arXiv:1906.06268, Feb. 4, 2019, 12 pages.
Cui et al., "Class-Balanced Loss Based on Effective Number of Samples", The Conference on Computer Vision and Pattern Recognition, Jun. 16-20, 2019, Long Beach, California, United States, pp. 1-11.
Deng et al., "Adaptive Personalized Federated Learning", arXiv:2003.13461, Mar. 30, 2020, 50 pages.
Dinh et al., "Personalized Federated Learning with Moreau Envelopes", The Conference and Workshop on Neural Information Processing Systems, Dec. 6-12, 2020, Virtual, pp. 1-23.
Evgeniou et al., "Multi-Task Feature Learning", The Conference and Workshop on Neural Information Processing Systems, Dec. 3-6, 2007, Vancouver, British Columbia, Canada, pp. 2-9.
Evgeniou, et al., "Regularized Multi-Task Learning", The International Conference on Knowledge Discovery and Data Mining, Aug. 22-25, 2004, Seattle, Washington, United States, pp. 1-9.
Fallah et al., "Personalized Federated Learning: A Meta-Learning Approach", The Conference and Workshop on Neural Information Processing Systems, Dec. 6-12, 2020, Virtual, pp. 1-29.
Fang et al., "Unbiased Metric Learning: On the Utilization of Multiple Datasets and Web Images for Softening Bias", The Institute of Electrical and Electronics Engineers International Conference on Computer Vision, Dec. 1-8, 2013, Sydney, Australia, pp. 1657-1664.
Hanzely et al., "Lower Bounds and Optimal Algorithms for Personalized Federated Learning", The Conference and Workshop on Neural Information Processing Systems, Dec. 6-12, 2020, Virtual, pp. 1-28.
Hanzely et al., "Federated Learning of a Mixture of Global and Local Models", arXiv:2002.05516, Feb. 14, 2020, 40 pages.
He et al., "Group Knowledge Transfer: Federated Learning of Large CNNs at the Edge", The Conference and Workshop on Neural Information Processing Systems, Dec. 6-12, 2020, Virtual, pp. 1-17.
He et al., "Deep Residual Learning for Image Recognition", The Conference on Computer Vision and Pattern Recognition (CVPR), Jun. 26-Jul. 1, 2016, Las Vegas, Nevada, United States, pp. 1-12.
Hsu et al., "Measuring the Effects of Non-Identical Data Distribution for Federated Visual Classification", arXiv:1909.06335, Sep. 13, 2019, pp. 1-5.
Hsu et al., "Federated Visual Classification with Real-World Data Distribution", The European Conference on Computer Vision (ECCV), Aug. 23-28, 2020, Online, pp. 1-21.
Huang et al., "Personalized Cross-Silo Federated Learning on Non-IID data", The AAAI Conference on Artificial Intelligence, Feb. 2-9, 2021, Vancouver, British Columbia, Canada, pp. 1-9.
Jacob et al., "Clustered Multi-Task Learning: A Convex Formulation", The Conference and Workshop on Neural Information Processing Systems, Dec. 6-8, 2009, Vancouver, British Columbia, Canada, pp. 1-14.
Jiang et al., "Improving Federated Learning Personalization via Model Agnostic Meta Learning", arXiv:1909.12488, 2019, 11 pages.
Jordan et al., "Machine Learning: Trends, Perspectives, and Prospects", Science, vol. 349, No. 6245, Jul. 17, 2015, pp. 2-7.
Kairouz et al., "Advances and Open Problems in Federated Learning", arXiv:1912.04977, Dec. 10, 2019, 121 pages.
Kang et al., "Decoupling Representation and Classifier for Long-Tailed Recognition", The International Conference on Learning Representations, Apr. 30, 2020, Addis Ababa, Ethiopia, pp. 1-16.
Karimireddy et al., "Mime: Mimicking Centralized Stochastic Algorithms in Federated Learning", arXiv:2008.03606, Aug. 8, 2020, 40 pages.
Khodak et al., "Adaptive Gradient-Based Meta-Learning Methods", The Conference and Workshop on Neural Information Processing Systems, Dec. 8-14, 2019, Vancouver, British Columbia, Canada, pp. 1-42.
Kingma et al., "Adam: A Method for Stochastic Optimization", The International Conference on Learning Representations, May 7-9, 2015, San Diego, California, United States, pp. 1-15.
Koh et al., "Wilds: A Benchmark of In-the-Wild Distribution Shifts", The International Conference on Machine Learning, Jul. 18-24, 2021, Virtual, pp. 1-131.
Kulkarni et al., "Survey of Personalization Techniques for Federated Learning", The World Conference on Smart Trends in Systems, Security and Sustainability, Jul. 27-28, 2020, London, United Kingdom, pp. 1-4.
Li et al., "Deeper, Broader and Artier Domain Generalization", In: Institute of Electrical and Electronics Engineers International Conference on Computer Vision, Oct. 22-29, 2017, Venice, Italy, pp. 1-9.
Li et al., "FedMD: Heterogenous Federated Learning via Model Distillation", arXiv:1910.03581, Oct. 8, 2019, 8 pages.
Li et al., "Ditto: Fair and Robust Federated Learning Through", arXiv:2012.04221, Dec. 8, 2020, 32 pages.
Li et al., "Federated Optimization in Heterogeneous Networks", The Conference on Machine Learning and Systems, Mar. 2-4, 2020, Austin, Texas, United States, pp. 1-22.
Li et al., "FedBN: Federated Learning on Non-IID Features via Local Batch Normalization", The International Conference on Learning Representations, May 3-7, 2021, Vienna, Austria, pp. 1-27.
Liang et al., "Think Locally, Act Globally: Federated Learning with Local and Global Representations", arXiv:2001.01523, Jan. 6, 2020, 34 pages.
Lin et al., "Ensemble Distillation for Robust Model Fusion in Federated Learning", The Conference and Workshop on Neural Information Processing Systems, Dec. 6-12, 2020, Virtual, pp. 1-17.
Mansour et al., "Three Approaches for Personalization with Applications to Federated Learning", arXiv:2002.10619, Jul. 19, 2020, 26 pages.
McMahan et al., "Communication-Efficient Learning of Deep Networks from Decentralized Data", The International Conference on Artificial Intelligence and Statistics, Apr. 20-22, 2017, Fort Lauderdale, Florida, United States, pp. 1-11.
Oh et al., "FedBaBu: Towards Enhanced Representation for Federated Image Classification", The International Conference on Learning Representations, Apr. 25-29, 2022, Virtual, pp. 1-29.
Papernot et al., "SoK: Towards the Science of Security and Privacy in Machine Learning", arXiv:1611.03814, Nov. 11, 2016, 19 pages.
Peng et al., "Moment Matching for Multi-Source Domain Adaptation", The Institute of Electrical and Electronics Engineers/CVF Conference on Computer Vision and Pattern Recognition (CVPR), Jun. 16-20, 2019, Long Beach, California, United States, pp. 1-24.

(56) References Cited

PUBLICATIONS

Peterson et al., "Private Federated Learning with Domain Adaptation", arXiv:1912.06733, Dec. 13, 2019, 6 pages.
Reisser et al., "Federated Mixture of Experts", arXiv:2107.06724, Jul. 14, 2021, 20 pages.
Ruder et al., "An Overview of Multi-Task Learning in Deep Neural Networks", arXiv:1706.05098, Jun. 15, 2017, 14 pages.
Rudovic et al., "Personalized Machine Learning for Robot Perception of Affect and Engagement in Autism Therapy", Science Robotics, vol. 3, No. 19, Feb. 2018, pp. 2-25.
Sahu et al., "On the Convergence of Federated Optimization in Heterogeneous Networks", arXiv:1812.06127, Dec. 14, 2018, 22 pages.
Smith et al., "Federated Multi-Task Learning", The Conference and Workshop on Neural Information Processing Systems, Dec. 4-8, 2017, Long Beach, California, United States, pp. 1-19.
Venkateswara et al., "Deep Hashing Network for Unsupervised Domain Adaptation", In: Institute of Electrical and Electronics Engineers International Conference on Computer Vision, Oct. 22-29, 2017, Venice, Italy, pp. 1-15.
Wang et al., "Federated Evaluation of On-Device Personalization", arXiv:1910.10252, Oct. 22, 2019, 6 pages.
Yang et al., "CondConv: Conditionally Parameterized Convolutions for Efficient Inference", The Conference and Workshop on Neural Information Processing Systems, Dec. 8-14, 2019, Vancouver, British Columbia, Canada, pp. 1-42.
Yu et al., "Salvaging Federated Learning by Local Adaptation", arXiv:2002.04758, Feb. 12, 2020, 11 pages.
Zec et al., "Federated Learning Using a Mixture of Experts", arXiv:2010.02056, Sep. 28, 2020, 10 pages.
Zhang et al., "Parameterized Knowledge Transfer for Personalized Federated Learning", The Conference and Workshop on Neural Information Processing Systems, Dec. 6-14, 2021, Virtual, pp. 1-13.
Zhang et al., "Personalized Federated Learning with First Order Model Optimization", The International Conference on Learning Representations, May 3-7, 2021, Virtual, pp. 1-17.
Zhang et al., "BasisNet: Two-Stage Model Synthesis for Efficient Inference", The Institute of Electrical and Electronics Engineers/CVF Conference on Computer Vision and Pattern Recognition (CVPR), Jun. 20-25, 2021, Nashville, Tennessee, United States, pp. 1-14.
Zhang et al., "A Survey on Multi-Task Learning", arXiv:1707.08114, Jul. 25, 2017, 20 pages.
Zhang et al., "A Convex Formulation for Learning Task Relationships in Multi-Task Learning", The Conference on Uncertainty in Artificial Intelligence, Jul. 8-11, 2010, Catalina Island, California, United States, pp. 1-10.
Zhou et al., "Distilled One-Shot Federated Learning", arXiv:2009.07999, Sep. 17, 2020, 16 pages.

* cited by examiner

Table 300

| Method | Complexity | Every Iteration | | Every 5 Epochs | |
|---|---|---|---|---|---|
| Evaluation | | PA | BA | PA | BA |
| Local Only | O(M x \|θ\|) | 74.1 | 39.3 | - | - |
| FED Avg | O(\|θ\|) | 86.3 | 86.3 | 66.3 | 66.1 |
| FED Avg + Fine Tuning | O(M x \|θ\|) | 90.7 | 57.0 | 81.4 | 54.3 |
| FEDBasis * | O(K x (M + \|θ\|)) | 90.2 | 66.0 | 69.0 | 68.8 |

PERSONALIZED FEDERATED LEARNING VIA SHARABLE BASIS MODELS

PRIORITY CLAIM

The present application claims the benefit of priority of U.S. Provisional Application Ser. No. 63/410,473, filed on Sep. 27, 2022, titled PERSONALIZED FEDERATED LEARNING VIA SHARABLE BASIS MODELS, which is incorporated herein by reference.

FIELD

The present disclosure relates generally to machine learning. More particularly, the present disclosure relates to personalized federated learning (PFL) via sharable basis models.

BACKGROUND

Recent years have witnessed a gradual shift in computer vision and machine learning from simply building a stronger model (e.g., image classifier) to taking more users' aspects into account. For instance, more attention has been paid to data privacy and ownership in collecting data for model training. Building models that are tailored to users' data, preferences, and characteristics have been shown to greatly improve user experience. Personalized federated learning (PFL) is a relatively new machine learning paradigm that can potentially fulfill the demands of both worlds. On the one hand, it follows the setup of federated learning (FL): training models with decentralized data held by users (i.e., clients). On the other hand, it aims to construct customized models for individual clients that would perform well for their respective data distributions.

While appealing, existing work of PFL has mainly focused on how to train the personalized models, e.g., via federated multi-task learning, meta-learning, fine-tuning, etc. In contrast, less attention has been paid to how to maintain the personalized models. Specifically, existing algorithms mostly require saving for each client a whole or partial model (e.g., a ConvNet classifier or feature extractor). This implies a linear parameter complexity with respect to the number of clients, which is parameter-inefficient and unfavorable for personalized cloud service—the cloud server needs a linear space of storage, not to mention the efforts for profiling, versioning, and provenance.

Learning parameters of a whole or partial model for each client has another issue when individual clients' data are scarce and distributionally skewed across classes. For instance, it is unlikely that a client can collect images of all possible object classes that would eventually show up in her environment. While federated learning itself enables collaboration among clients, (e.g., learning to recognize the missing objects from other clients' data), training model parameters specifically for each client is prone to over-fitting to each client's data distribution. In other words, the resulting personalized models are likely biased toward ignoring the rare or missing classes and thus are highly sensitive to class distribution changes during testing

SUMMARY

Aspects and advantages of embodiments of the present disclosure will be set forth in part in the following description, or can be learned from the description, or can be learned through practice of the embodiments. The embodiments are directed towards providing personalized federated learning (PFL) models via sharable basis models. A model architecture and learning algorithm for PFL models is disclosed. The embodiments learn a set of basis models, which can be combined layer by layer to form a personalized model for each client using specifically learned combination coefficients. The set of basis models may be shared with each client of a set of the clients. Thus, the set of basis models is common to each client of the set of clients. However, each client may generate a unique PFL based on their specifically learned combination coefficients. The unique combination of coefficients for each client may be encoded in a separate personalized vector for each of the clients.

One example aspect of the present disclosure is directed to a computer-implemented method. The method includes a server device providing, each client device of a set of client devices, a set of untrained models. The server devices causes each client device of the set of client devices, to generate a separate set of trained models based on the set of untrained models. Each client device iteratively trains the set of untrained models based on a separate subset of a set of training data that is located locally on the client device. Each subset of the set of training data is inaccessible by the server device. Each subset of the set of training data is inaccessible by the client device except for the subset of training data that is located locally on the client device. The server device may receive a separate set of trained models from each client device. The server device may generate a set of basis models based on a combination of the separate set of trained models received from each of the client devices. The server device may provide the set of basis models to each client device of the set of client devices. The server device may cause each client of the set of client devices to generate a personalized model based on a separate linear combination of the basis models of the set of basis models.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
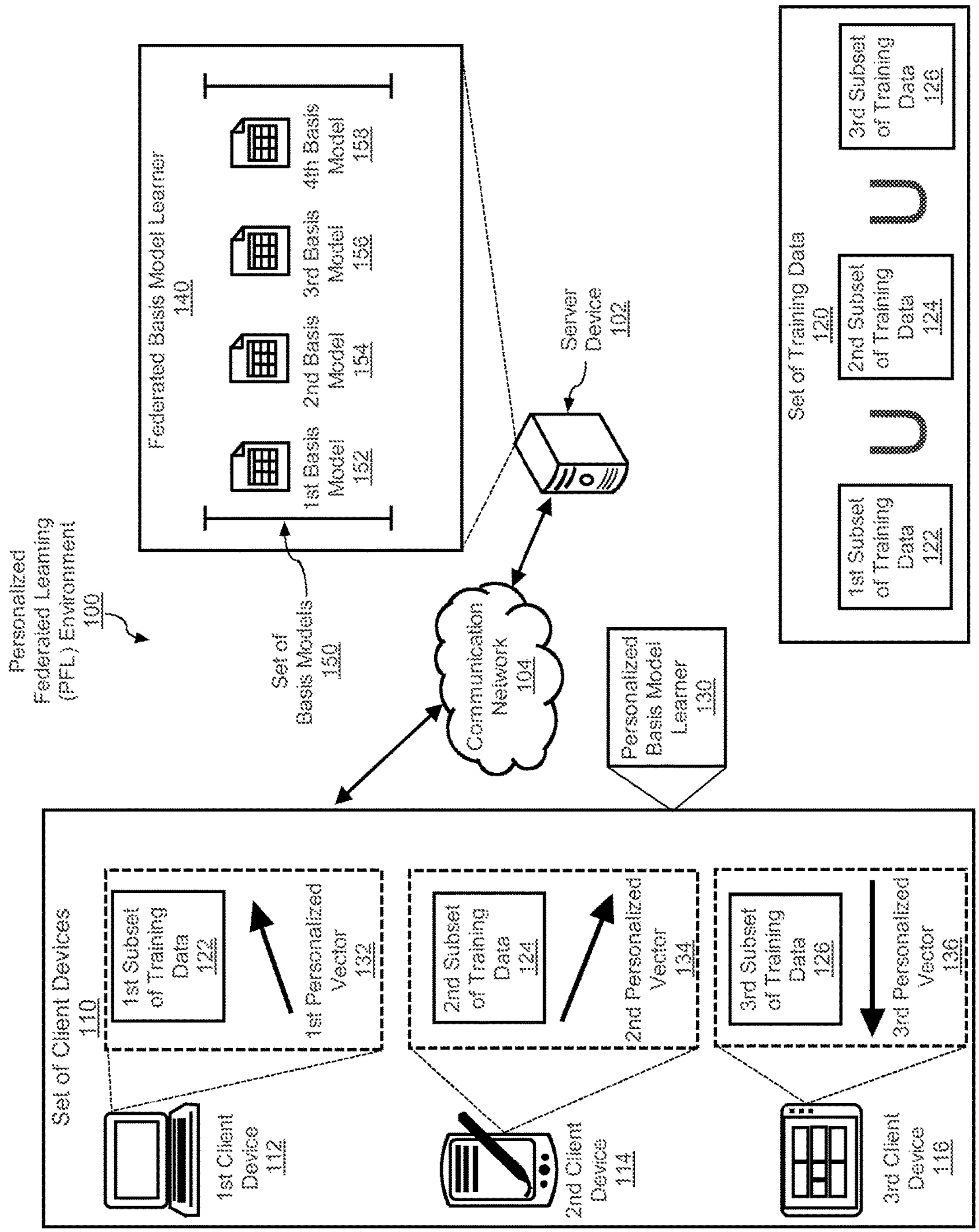
FIG. 1 depicts a block diagram of an example personalized federated learning environment, according to various embodiments.

To address the deficiencies of conventional personalized federated learning (PFL) discussed throughout, a model architecture and learning algorithm for personalized federated learning (PFL) is disclosed. The embodiments learn a set of basis models, which can be combined layer by layer to form a personalized model for each client using specifically learned combination coefficients. The set of basis models may be shared with each client of a set of clients. However, each client may generate a unique PFL based on their specifically learned combination coefficients. The unique combination of coefficients for each client may be encoded in a separate personalized vector for each of the clients. Thus, the set of basis models is common to each client of the set of clients. That is, although the basis models (or basis functions) are shared amongst the clients, each client of the set of clients may have their own linear combination of the basis models (e.g., the expansion coefficients of the linear combination may be encoded in the personalized vector for the client), that serves as a personalized for the set of models.

This model architecture bypasses the linear parameter complexity without increasing the inference time. In some embodiments, the basis models may be trained via a federated averaging procedure (e.g., iterating between local model training for multiple epochs and global aggregation). However, other embodiments may additionally include a coordinate descent style training algorithm with combination coefficient sharpening. This architecture and/or method(s) may be referred to as a federated basis model (e.g., a sharable federated basis model) throughout. A federated basis model not only enjoys its built-in parameter efficiency but also maintains high personalized classification accuracy. Moreover, by learning the shareable basis models and using them to construct personalized models, it is shown that the embodiments are significantly more robust in coping with class distribution changes.

A great portion of the work in conventional federated learning (GFL) has focused on the generic setting: collaboratively training a single "global" model. The sharable federated basis model of the embodiments is an algorithm that iterates between local model training and global model aggregation. Most PFL models (e.g., excluding the federated basis models of the embodiments) have limitations arising from the potential discrepancy among clients' data distributions (i.e., the non-independent and identically distributed (IID) condition), which makes the local models diverge from each other. Conventional GFL-based algorithms have been proposed to improve various PFL models. For instance, global aggregation has been proposed to replace weight average by model ensemble and distillation. Local training has been proposed to employ regularization or control varieties to adjust or correct local gradients.

In contrast to GFL, PFL models (e.g., including the personalized federated basis models of the embodiments) take into account the discrepancy among clients and learns for each client a personalized model tailored to her data distribution. Many conventional PFL approaches are based on multi-task learning (MTL), which leverages the clients' task relatedness to improve model generalizability. For instance, some conventional PFL approaches encourage related clients to learn similar models; regularized local models with a learnable global model, prior, or set of data logits; designed the model architecture to have personalized and shareable components. Some other conventional PFL approaches are based on mixture models, with (separately) learned global and personalized models and performed a mixture of them for prediction. Meta-learning is also applied to learn an initialized model that can be adapted to each client rapidly. It is worth noting that all these conventional PFL approaches require saving for each client the parameters of a whole or partial model.

In contrast to some conventional PFL approaches, the embodiments formulate each task model as a linear combination of a set of basis models. This makes the embodiments clearly different from conventional PFL approaches, as the embodiments bypass the linear parameter complexity. Some conventional PFL approaches learn basis models that can be used to initialize or regularize personalized models. However, these conventional PFL approaches still need a linear parameter complexity for the final personalized models.

Aspects of the present disclosure provide a number of technical effects and benefits. For instance, the embodiments include a novel model architecture (e.g., a sharable federated basis model) and learning algorithm, which alleviates the linear model complexity in PFL and improves the distributional robustness. More specifically, conventional PFL approaches have a linear parameter complexity and each client keeps a model. In the herein embodiments, the clients only keep coefficients for combining a few basis models. That is, the embodiments provide separate set of expansion coefficients for a set of sharable basis models to each client of a set of clients. The embodiments bypass the linear parameter complexity in maintaining personalized models and overcome their vulnerability to class distribution changes. To this end, the embodiments are directed to a novel sharable federated basis model architecture and algorithm, which constructs each personalized model by a few, shareable basis models. An enhanced training algorithm is designed systematically and mathematically soundly to overcome the collapse problem of basis models due to local training. Along with federated basis models, a new and carefully designed PFL benchmark (PFLBed) is presented herein. Empirical studies presented herein demonstrate the effectiveness of federated basis models.

FIG. 1 depicts a block diagram of an example personalized federated learning (PFL) environment 100, according to various embodiments. PDL environment 100 includes a server device 102 and a set of client devices 110. The set of client devices 110 may include a first client device 112, a second client device 114, and a third client device 116. In other embodiments, the set of client devices 110 may include fewer or additional client devices. Each of the client devices of the set of client devices may be communicatively coupled to the server device 102 via a communication network 104.

Each of the client devices of the set of client devices 110 may implements a personalized basis model learner 130. The server device 140 may implement a federated basis model learner 140. As discussed throughout, each of the personalized basis model learner 130 and the federated basis model learner 140 contribute to the training of each basis model of a set of basis model 150. In the example embodiment shown in FIG. 1, the set of basis models 150 includes four basis models: a first basis model 152, a second basis model 154, a third basis model 156, and a fourth basis model 158. In other embodiments, the set of basis models 150 may include fewer or greater than four basis models. Each basis model of the set of basis models 150 may include a set of model parameters, model weights, or numerical values that parameterize the basis model. Each basis model of the set of basis models 150 may include an equivalent or similar model architecture. Each basis model of the set of basis models 150 may be implemented via a deep neural network.

Each client device of the set of client devices 110 may locally store a separate (e.g., a unique) subset of a set of training data 120. For instance, the first client device 112 may locally store a first subset of training data 122, the second client device 114 may locally store a second subset of training data 124, and the third client device 116 may locally store a third subset of training data 126. As shown in FIG. 1, the set of training data 120 may include the union of the first subset of training data 122, the second subset of training data 124, and the third subset of training data 126. Each subset of the set of training data 120 may include labeled training data that may be employed via supervised learning techniques. In some embodiments, each subset of the set of training data 120 is stored only on client devices of the set of client devices 110. Thus, each piece of data of the set of training data 120 may be inaccessible by the server device 102 and/or the federated basis model learner 140. Furthermore, each of the various subsets of the set of training data 120 is stored only on its corresponding client device. Thus, each client device of the set of client devices 110 may only access its own locally stored subset of the set of training data 120. That is, each of the various subsets of training data is inaccessible to a client device of the set of client devices 110, except for the subset of training data that is stored locally on the client device. Accordingly, the various embodiments ensure the data privacy of each of the client devices of the set of client devices 110.

Each client device of the set of client devices 110 may implement a personalized federated learning (PFL) model. The PFL model for a client device is a personalized linearly weighted combination of the set of basis models 150. To generate a PFL model, a client device may learn and/or generate a personalized vector. A personalized vector for a client device may indicate the linear combination of the basis models of the set of basis models 150 for the client device. The values of the components may indicate the weights for the linear combination of the set of basis models. As such, each component of a personalized vector may correspond to a particular basis model of the set of basis models 150. Thus, the dimensionality of a personalized vector may be equivalent to the cardinality of the set of basis models 150. In the non-limiting example of FIG. 1, because the cardinality of the set of basis models is four, the personalized vectors for the client devices may be 4D vectors.

In addition to at least partially training each basis model of the set of basis models 150, a client device may employ the personalized basis model learner 130 to learn its own personalized vector. For example, the first client device 112 learns a first personalized vector 132, the second client device 114 may learn a second personalized vector 134, and the third client device 116 may learn a third personalized vector 136. In various embodiments, the data privacy or a personalized vector (and this the data privacy of a PFL model) is ensured. For instance, the server device 102 and/or the federated basis model learner 140 may not have access to any of the personalized vectors of the client devices of the set of client devices 110. Furthermore, each client device may only have access to its own personalized vector. For instance, first client device 112 may access its own personalized vector (i.e., first personalized vector 132), however, the second personalized vector 134 of the second client device 114 and the third personalized vector 136 of the third client device 116 may be inaccessible to the first client device 112.

Figure 2:
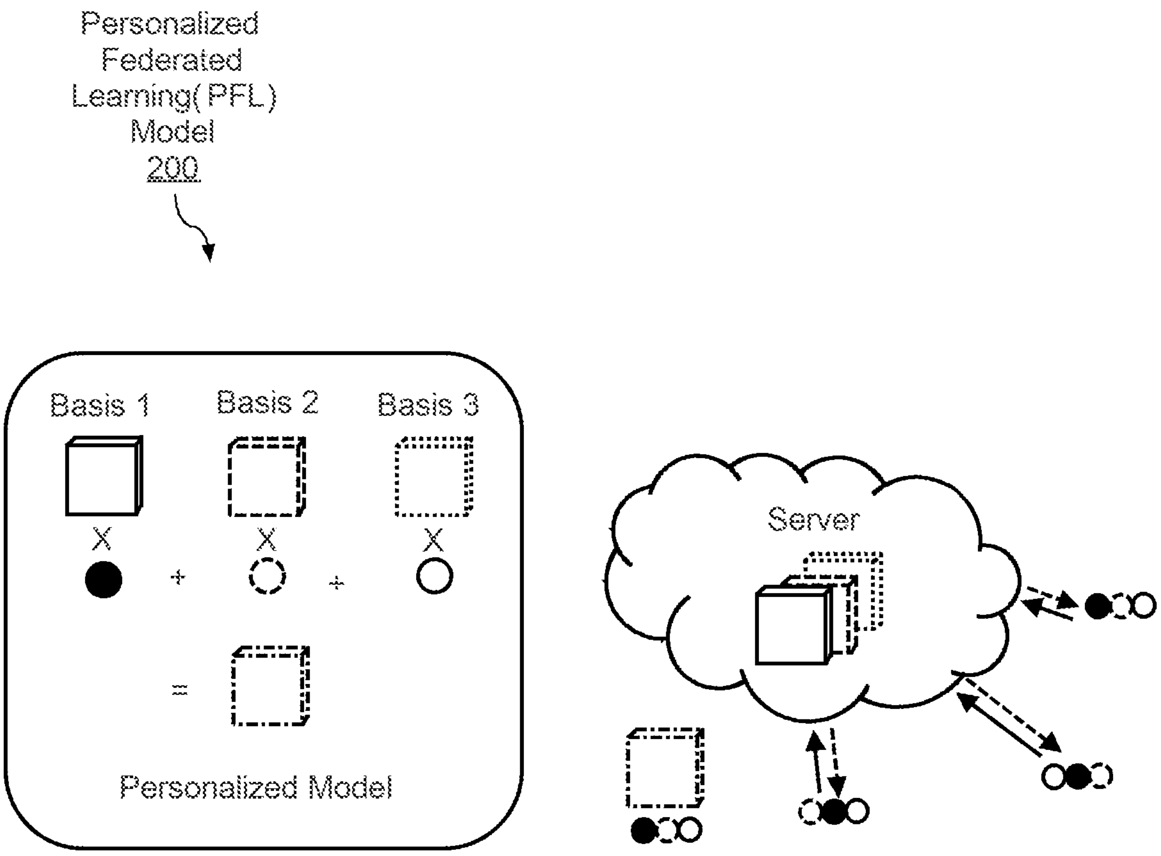
FIG. 2 depicts a block diagram of an example personalized federated learning model, according to various embodiments.

FIG. 2 depicts a block diagram of an example personalized federated learning model 200, according to various embodiments. FIG. 2 shows a server, where the server stores a set of basis models. The server of FIG. 2 may be similar to server device 102 of FIG. 1. The set of basis models of FIG. 2 may be similar to the set of basis models 150 of FIG. 1. The set of basis models of FIG. 2 includes three basis models, referred to as Basis1, Basis2, and Basis3. The server of FIG. 2 serves a set of clients that may be similar to the set of clients 110 of FIG. 1. The set of clients of FIG. 2 includes four clients, that each has personalized 3D vector. The three components of the personalized vector of the leftmost client are represented by the 3-tuple {0.8, 0.15, 0.05}. The PFL model 200 is the PFL model for the leftmost client. As shown in FIG. 2, the PFL model 200 is a linear combination of the basis models in accordance to the personalized vector, e.g., (0.8)*Basis1+(0.15)*Basis2+(0.05)*Basis3.

General Federated Learning and Personalized Federated Learning

As a general example, a classifier $h_\theta = g_w \circ f_\phi$ may be learned, where $f_\phi$ is the feature extractor parameterized by $\phi$ and $g_w$ is the classification head parameterized by w. $\theta$ is employed to denote $\{\phi, w\}$.

In centralized learning, the training set $\mathcal{D}=\{(x_1, y_1), \ldots, (x_N, y_N)\}$ is given, where x is the input (e.g., an image) and $y \in \{1, \ldots, C\}=[C]$ is the truth label. Given the loss function $\ell$ (e.g., a cross-entropy loss function), a typical way to learn $\theta$ may include minimizing the empirical risk $\mathcal{L}$:

$$\min_\theta \mathcal{L}(\theta) = \frac{1}{N} \Sigma_{i=1}^{N} \ell(y_i, h_\theta(x_i)). \tag{1}$$

In generic federated learning (GFL), the goal remains the same—to train a "global" model $h_\theta$. However, the training data are now collected and separately stored by M clients: each client $m \in [M]$ keeps a private set $$\mathcal{D}_m = \{(x_i, y_i)\}_{i=1}^{|\mathcal{D}_m|}.$$

Let $\mathcal{D} \cup_m \mathcal{D}_m$ denote the pseudo aggregated data from all clients. Thus, each $\mathcal{D}_m$ is a separate subset of $\mathcal{D}$, where $\mathcal{D}$ may be referred to as a set of training data. Let $\mathcal{L}_m$ denote the empirical risk of client m, the problem in equation (1) becomes $$\min_\theta \mathcal{L}(\theta) = \Sigma_{m=1}^{M} \frac{|\mathcal{D}_m|}{|\mathcal{D}|} \mathcal{L}_m(\theta). \tag{2}$$

Unfortunately, equation 2 cannot be solved directly since the data are decentralized. One standard solution is federated averaging (FedAvg), which decomposes the optimization into a multi-round process. Within each round, the server first broadcasts the "global" model to the clients. The clients then perform local training in parallel to update the model by minimizing each client's empirical risk. The "local" models are then returned to the server and globally aggregated into an updated "global" model by element-wise averaging over local model parameters. Let $$\bar{\theta}^{(t)}/\tilde{\theta}_m^{(t)}$$

denote the global/local model after round t, the local training and global aggregation steps can be formulated as $$Local training: \tilde{\theta}_m^{(t)} = \arg\min_\theta \mathcal{L}_m(\theta),\ initialized by \bar{\theta}^{(t-1)}, \tag{3}$$

$$Global aggregation: \bar{\theta}^{(t)} \leftarrow \sum_{m=1}^{M} \frac{|\mathcal{D}_m|}{|\mathcal{D}|} \tilde{\theta}_m^{(t)}.$$

Local training is often implemented by stochastic gradient descent (SGD). The fewer the gradient steps are per round, the closer the resulting $\bar{\theta}^{(t)}$ is to the solution of equation (2). This, however, needs a significant number of communication rounds to converge and is infeasible in practice. Thus, each round of local training usually takes several epochs.

In contrast to GFL, personalized federated learning (PFL) aims to learn for each client m a customized model $\theta_m$, whose goal is to perform well on client m's local training data. While there is no standard objective function, the optimization problem may be defined as:

$$\min_{\{\Omega, \theta_1, \ldots, \theta_M\}} \frac{1}{M} \sum_{m=1}^{M} \mathcal{L}_m(\theta_m) + \mathcal{R}(\Omega, \theta_1, \ldots, \theta_M), \tag{4}$$

where $\mathcal{R}$ is a regularizer; $\Omega$ is introduced to relate clients. The regularizer is imposed to encourage related clients to learn similar models, to overcome their limited data. In contrast to equation (2), equation (4) seeks to minimize each client's empirical risk (plus a regularizer) by the corresponding personalized model $\theta_m$. In practice, PFL algorithms often run iteratively between the local and global steps as well, so as to update $\Omega$ periodically according to clients' models.

Some embodiments may perform fine-tuning to the global model of FedAvg to generate personalized models. In such embodiments, the global aggregation of FedAvg may serve as a strong implicit regularizer.

Personalized Federated Learning with Basis Models; Formulation

While both solving equation (4) and fine-tuning the FedAvg's global model can lead to personalized models, they require learning and saving the parameters of a whole (or partial) model for each of the M clients—i.e., linear parameter complexity $\mathcal{O}(M \times |\theta|)$. This is particularly unfavorable for maintaining the models, especially when a huge number of clients are involved, and the personalized models are eventually operating on the cloud. Besides, model parameters learned specifically for each client would inevitably adapt to the client's data distribution, even with regularization. If the distribution is skewed across classes, the resulting personalized models would be vulnerable to class distribution changes.

To resolve these issues in PFL, the embodiments employ a novel method to construct personalized models to bypass the linear parameter complexity. Each personalized model (e.g., $\theta_m$) may be represented as the linear combination of basis models:

$$\theta_m = \Sigma_k\, \alpha_m[k] \times v_k, \tag{5}$$

where $\mathcal{V} = \{v_1, \ldots, v_K\}$ is a set of K basis models shareable among clients, and $\alpha_m \in \Delta^{K-1}$ is a K-dimensional vector on the (K−1)-simplex that records the personalized convex combination coefficients. That is, each personalized model is a convex combination of a set of basis models.

With this representation, the total parameters to save for all clients become $$(K \times |\theta| + K \times M) \simeq \mathcal{O}(K \times |\theta|). \tag{6}$$

Here, $\mathcal{O}(K \times M)$ corresponds to all the combination coefficients $\mathcal{A} = \{\alpha_1, \ldots, \alpha_M\}$, which is negligible since for most of the modern neural network models, $|\theta| >> M$. It is noted that when K=M and the combination vectors are all one-hot with $\alpha_m[m]=1$, this representation reduces to saving for each client a model. However, when clients' data share similarity—a common assumption made in multi-task learning—it is likely K<<M can be used to construct high-quality personalized models and meanwhile largely reduce the number of parameters.

Objective function. Building upon the model representation in equation (5) and the optimization in equation (5), PFL problem for the embodiments may be represented as:

$$\min_{\mathcal{A} = \{\alpha_m\}_{m=1}^{M}, \mathcal{V} = \{v_k\}_{k=1}^{K}} \frac{1}{M} \sum_{m=1}^{M} \mathcal{L}_m(\theta_m), \text{ where } \theta_m = \sum_k \alpha_m[k] \times v_k. \tag{7}$$

It is noted that both the basis models and combination coefficient vectors are to be learned. The regularization term in equation (4) may be dropped, as the convex combination representation itself may be a form of regularization.

Training. The optimization of equation (7) is discussed below.

Inference. The convex combination takes place in the model parameter space. Before making predictions, a single personalized model $\theta_m$ is first constructed by convexly combining the parameters of basis models in $\mathcal{V}$ layer-by-layer. The inference time on each image thus remains the same as existing PFL methods. This is sharply different from the conventional mixture of experts procedure, which combines the predictions of expert models, not their parameters. Namely, it needs to perform multiple times of inference on each image before the final prediction can be made. The various embodiments may be differentiated from conventional approaches at least because the embodiments extending such concepts to PFL, identifying difficulties in optimization, and resolving them accordingly.

Personalized Federated Learning with Basis Models: Baseline Training

Similarly to equation (2), equation (7) cannot be solved directly since the clients' data are decentralized. In this subsection a baseline training algorithm is presented.

Baseline training algorithm. As the basis models $\mathcal{V}$ are shared among clients, they can be conceptually considered as global models. A FedAvg-style training algorithm is developed by iterating between local and global steps/

$$\text{Local: } \left\{\alpha_m^{(t)}, \hat{\mathcal{V}}_m^{(t)}\right\} = \text{argmin}_{\{\alpha,\mathcal{V}\}}\mathcal{L}_m(\alpha, \mathcal{V}), \tag{8}$$

$$\textit{initializedby}\left\{\alpha_m^{(t-1)}, \overline{\mathcal{V}}^{(t-1)}\right\},$$

$$\text{Global: } \overline{\mathcal{V}}^{(t)} \leftarrow \frac{1}{M}\sum_{m=1}^{M} \hat{\mathcal{V}}_m^{(t)}.$$

Here, $\mathcal{L}_m(\alpha, \mathcal{V})$ is used as a concise notation for $\mathcal{L}_m(\theta=\Sigma_k \alpha[k]\times v_k)$. It is worth noting that in local training, client m only updates her own coefficients $$\alpha_m^{(t)},$$

not others'; every client can potentially update all basis models in $\hat{\mathcal{V}}_m^{(t)}$. α is implemented by a softmax function to ensure that it learns a convex combination. The final personalized model for client m, after T rounds, is $$\theta_m = \sum_k \alpha_m^{(T)}[k] \times \overline{v}_k^{(T)}.$$

Brief experimental setup. To analyze the baseline algorithm, a PFL experiment is conducted. The PACS dataset is employed, which contains in total 7K training images from 7 classes. The procedure detailed in the below section is followed to split the training images into M=40 clients. Each client has images from one of the four domains (Photo, Art, Cartoon, Sketch); the class distribution $\mathcal{P}_m$ (y) of each client m is sampled from a Dirichlet distribution to make it skewed and not identical among clients. These strategies create highly heterogeneous clients' data. K=4 bases are used and model each by a ResNet-18. Each basis model is randomly initialized. For more details, please see s_pflbed and s_exp.

For evaluation, a class-balanced global test set is prepared for each image domain. Without loss of generality, it is assumed that each test set has the same number of test images N, and each test sample is indexed by j. To evaluate the accuracy of client m, the global test set of client m's domain is used. Specifically, two accuracies are calculated as:

$$\textit{Personalizedaccuracy}: PA_m = \frac{\sum_j \mathcal{P}_m(y_j)1\left[y_j = h_{\theta_m}(x_j)\right]}{\sum_j \mathcal{P}_m(y_j)}, \tag{9}$$

$$\textit{Balancedaccuracy}: BA_m = \frac{1}{N}\sum_i 1\left[y_j = h_{\theta_m}(x_j)\right].$$

The personalized accuracy weighs each test sample by $\mathcal{P}_m$ ($y_j$) to reflect the class distribution of client m's training data. This can be considered as the standard personalized accuracy in literature. The balanced accuracy, in contrast, treats each test sample of client m's domain equally. This is to simulate the situation that a client does not have sufficient resources to collect her training data to faithfully reflect the class distribution in her environment. In this case, a class-balanced test set may be used to assess the personalized model's distributional robustness. To summarize over clients, the average may be taken over their accuracy.

Unlimited communication. In terms of the number of local gradient steps per round and the number of total rounds, an ideal case that includes unlimited communication is first considered. This allows a performance of global aggregation as soon as soon as possible; i.e., after each mini-batch SGD step. It is noted that this training strategy is basically equivalent to mini-batch SGD in centralized learning.

Figures 3A, 3B:
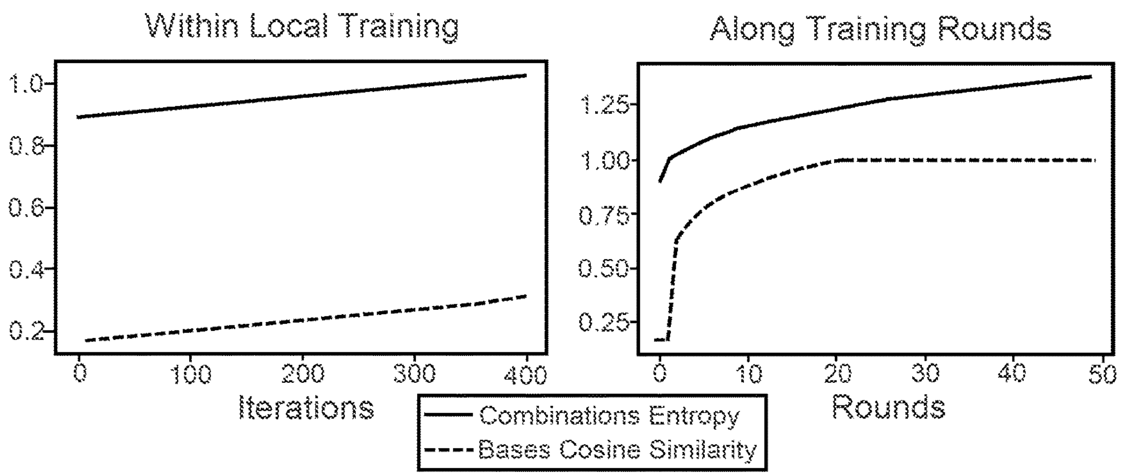
FIG. 3A provides a table of experimental results for the various embodiments employing PACS datasets.
FIG. 3B provides plots for a cosine similarity between bases and the entropy of clients combination vectors of PACS datasets.

FIG. 3A provides a table 300 of experimental results for the various embodiments employing PACS datasets. Table 300 (every iteration column) summarizes the results, in which training occurs with the number of rounds equal to 100 epochs overall. That is, table 300 encodes experimental results for PACS datasets with different communication frequency. That is, a federated basis model with baseline training including M=40 and K=4. PA: personalized accuracy; BA: class-balanced accuracy. Both are averaged over clients For comparison, results of FedAvg (global model) and FedAvg+local fine-tuning (personalized models) are included in table 300. Both are trained under the ideal case. For FedAvg, the global model is treated as personalized models. Local training only is also included; i.e., training each personalized model independently. The following observations may be made from table 300:

1. Local training alone is poor, demonstrating the need of FL.
2. FedAvg achieves the best balanced accuracy while FedAvg+local fine-tuning, as a strong PFL algorithm, achieves the best personalized accuracy.
3. Using much fewer parameters (K=4 vs. M=40), A federated basis model achieves a comparable personalized accuracy to FedAvg+local fine-tuning and is more distributionally robust than it on balanced accuracy.

In other words, under the ideal case, the capacity and capability of the convex combination representation of personalized models is justified. The distributional robustness may be attributed to the collaboratively learned and shared basis models, which are less likely to be biased/over-fitted to the skewed local training data.

Limited communication. In practice, due to communication constraints, it is infeasible to perform global aggregation after each mini-batch SGD. Thus, the standard case is studied by performing local training for a few epochs per round. Table 300 (every 5 epochs columns) summarizes the results (with 100 rounds). Almost all algorithms degrade. Specifically, following further observations may be attributed to the data of table 300:

4. FedAvg degrades significantly on both personalized and balanced accuracy, which is however understandable due to non-IID clients' data.
5. FedAvg+fine-tuning still improves personalized accuracy.
6. A federated basis model in the more standard FL setting can no longer match the personalize accuracy of FedAvg+fine-tuning. Instead, it performs almost like (i.e., degenerates to) FedAvg's global model.
7. Namely, the constructed personalized models seem almost identical among clients.

Analysis. To have a better understanding of the issue, the training dynamics are investigated. Specifically, both a) the average pairwise cosine similarity between the basis model parameters; and b) the entropy of the learned combination vectors are checked. A high entropy implies an almost uniform combination vector.

FIG. 3B provides plots for a cosine similarity between bases and the entropy of clients combination vectors of PACS datasets. In FIG. 3B, it is found that both the pairwise similarity and the entropy increase along with local training steps (iterations) and along with training rounds. In other words, the basis models gradually collapse to a single basis, and the combination vectors of all clients nearly collapse to uniform combinations. Consequently, each basis model does not learn specialized knowledge; the whole bases $\mathcal{V}$ basically degrades to a single global model. This explains why in table 300, the performance of the federated basis model is very similar to FedAvg, which is essentially a federated basis model with K=1.

By taking a deeper look at FIG. 3B, it may be found that the collapse problem happens primary in local training. To explain it, let us analyze the gradients derived at local training (cf. equation (8)).

$$\nabla_{v_k}\mathcal{L}_m(\alpha, \mathcal{V})=\alpha[k]\times\nabla_\theta\mathcal{L}_m(\theta),$$

$$\nabla_{\alpha[k]}\mathcal{L}_m(\alpha, \mathcal{V})=v_k\cdot\nabla_\theta\mathcal{L}_m(\theta). \quad (10)$$

Interesting, while with different magnitudes, it is found that $\nabla_{v_k}\mathcal{L}_m(\alpha, \mathcal{V})$ pushes every local basis model $v_k \in \tilde{\mathcal{V}}_m^{(t)}$ towards the same direction (since α[k]≥0). As local basis models gets similar towards $\nabla_{74}\mathcal{L}_m(\theta)$, their inner products with $\nabla_\theta\mathcal{L}_m(\theta)$ will become larger (i.e., positive) and similar, which would in turn push α[k] to be larger via a similar strength. Through forcing α to be on the (K−1)-simplex (e.g., by reparameterizing α via a softmax function), α will inevitably become uniform. In other words, the more mini-batch SGD steps that are performed within each round of local training, the more similar the local basis models and the more uniform the combination coefficients will be. The updated $\bar{\mathcal{V}}^{(t)}$, after aggregating $\tilde{\mathcal{V}}_m^{(t)}$ over clients, thus would have every of its basis similar to the global model of FedAvg.

It is noted that this phenomenon does not appear in the ideal case because global aggregation is performed right after each mini-batch SGD step, which prevents the above-mentioned similarity from accumulating.

Personalized Federated Learning with Basis Models: Enhanced Training

To prevent the collapse problem in the federated basis models of the embodiments which is due to multiple steps or epochs of local training per round, the following treatments are proposed for the various embodiments.

Coordinate descent for the combination coefficients and bases. Within each round, a first update α (for multiple SGD steps) while freezing $\mathcal{V}$ is proposed, and then update $\mathcal{V}$ (for multiple SGD steps) while freezing α. It is noted that at the beginning of each round of local training, $v_k\cdot\nabla_\theta\mathcal{L}_m(\theta)$ is not necessarily positive. Updating α with frozen $\mathcal{V}$ thus could potentially enlarge the difference among elements in α: forcing the personalized model to attend to a subset of bases. After starting to update $\mathcal{V}$, α may be frozen to prevent the collapse problem.

Sharpening combination coefficients and regularizing bases. Since α[k]≥0, updating $v_k$ locally with $\theta_{v_k}\mathcal{L}_m(\alpha, \mathcal{V})$ would inevitably increase the cosine similarity between basis models. The exception is when some α[k]=0, which results in 0 gradients. Therefore, some embodiments may artificially and temporally enforce this while calculating $\nabla_{v_k}\mathcal{L}_m(\alpha, \mathcal{V})$. This can be accomplished by setting a hard threshold and zero out a[k] smaller than it, or by setting a fixed number of nonzero elements in a and zero out elements of small values. In various embodiments, a soft version of this may be applied, which is to sharpen a while calculating $\nabla_{v_k}\mathcal{L}_m(\alpha, \mathcal{V})$. As mentioned earlier, a may be implemented by reparametrizing it via a softmax function. Specifically, $\psi \in \mathbb{R}^K$ may be learned and α[k] may be calculated by $$\frac{\exp(\psi[k])}{\Sigma_{k'}\exp(\psi[k'])}.$$

During sharpening, a temperature parameter 1≥τ≥0 may be introduced and α[k] may be calculated by $$\frac{\exp(\psi[k]/\tau)}{\Sigma_{k'}\exp(\psi[k']/\tau)}.$$

In some embodiments, this is only performed temporally wile calculating $\nabla_{v_k}\mathcal{L}_m(\alpha, \mathcal{V})$ for updating $v_k$.

Another way to alleviate the collapse problem may be investigated as follows. Suppose at the beginning of each round of local training, bases in the newly broadcast $\bar{\mathcal{V}}^{(t-1)}$ are specialized, then one way to preserve their specialized knowledge during local training is via basis-wise regularization, towards the broadcast bases.

Improved training algorithm. Putting these treatments together, an improved training algorithm for the embodiments based on equation (8) is presented below:

$$\text{Local: initialize}\{\alpha, \mathcal{V}\}\text{by}\{\alpha_m^{(t-1)}, \bar{\mathcal{V}}^{(t-1)}\}, \quad \text{[Step 1]}$$

$$\alpha_m^{(t)} = \text{argmin}_\alpha\mathcal{L}_m(\alpha, \mathcal{V}), \quad \text{[Step 2]}$$

$$\alpha_m^{(t)\dagger} \leftarrow \text{Sharpen}(\alpha_m^{(t)}; \tau), \quad \text{[Step 3]}$$

$$\tilde{\mathcal{V}}_m^{(t)} = \text{argmin}_\mathcal{V}\mathcal{L}_m(\alpha_m^{(t)\dagger}, \mathcal{V}) + \lambda\times\|\mathcal{V} - \bar{\mathcal{V}}^{(t-1)}\|_F^2, \quad \text{[Step 4]}$$

$$\text{Global: } \bar{\mathcal{V}}^{(t)} \leftarrow \frac{1}{M}\sum_{m=1}^{M}\tilde{\mathcal{V}}_m^{(t)}, \quad (11)$$

Here, $\|\cdot\|_F$ is the Frobenius norm. The personalized model for client m, after T rounds, is $$\theta_m = \sum_k \alpha_m^{(T)}[k]\times\bar{v}_k^{(T)}.$$

Personalized Federated Learning with Basis Models: An Extension

So far, the same coefficient α[k] are applied to combine $v_k$ into $\theta_m$ (cf. equation (5)). Such formula can be slightly generalized to decouple coefficients for the feature extractors and classification heads. For instance, some clients may have the same image styles but different class distributions. Recall $h_{\theta_m}=g_{w_m}\circ f_{\phi_m}$, with the feature extractor $f_{\phi_m}$ and the classification head $g_{w_m}$. A separate set of (bases, combination coefficients) for the feature extractor and classification head may be maintained, respectively. That is, $$\mathcal{V}^\phi = \{v_k^\phi\}, \mathcal{V}^w = \{v_k^w\}, \text{ and } \mathcal{A} = \{(\alpha_m^\phi, \alpha_m^w)\}_{m=1}^M, \text{ where}$$

$$\alpha_m^\phi \in \mathbb{R}^{|\mathcal{V}^\phi|} \text{ and } \alpha_m^w \in \mathbb{R}^{|\mathcal{V}^w|}, \forall\, m \in [M].$$

It is noted that the number of bases of ϕ and w do not need to be the same (i.e., $|\mathcal{V}^\phi|$ vs. $|\mathcal{V}^w|$).

PFLBed: Bases for Building Personalized Benchmarks

There have been many efforts on building datasets for generic FL, but how should construct a reliable dataset be constructed along with the evaluation protocols for PFL algorithm development? Consider the following aspects:

Cross-domain with non-IID $\mathcal{P}_m(x, y)$. A challenging personalized dataset should have the joint distribution $\mathcal{P}_m(x, y)$ differ from client to client, not just $\mathcal{P}_m(x)$ (e.g., styles, domains) or $\mathcal{P}_m(y)$ (i.e., class labels). Both the training data sizes and the class distributions should be skewed among clients.

Sufficient test samples and matched training/test splits. The test set should be large enough for reliable evaluation. This is challenging when there are many clients, each with a small data size. For example, the popular 62-class hand-written character FEMNIST dataset only has 226 images for each writer on average; many classes only have ≤1 image. It is unfaithful to split each client into train/test sets due to mismatches on $\mathcal{P}_m(y)$. Indeed, a large discrepancy $$\frac{1}{M}\Sigma_m\left\|\mathcal{P}_m^{train}(y) - P_m^{test}(y)\right\|_1 = 0.77$$

is found even with a 50%/50% split.

Distributional robustness. As discussed above, the balanced accuracy to evaluate distributional robustness for the case of object recognition inspired by the practice in class-imbalanced learning may be included. It is noted that changing only the testing $\mathcal{P}_m(y)$ but not $\mathcal{P}_m(x)$ (domains).

To achieve these desired properties, it is proposed to transform a cross-domain dataset $\mathcal{D}$ into clients' sets $$\{(\mathcal{D}_m^{train}, \mathcal{D}_m^{test/val})\}$$

with the following procedures.

1. Separate $\mathcal{D}$ based on its domains.
2. For each domain, first split a class-balanced test/validation set which will be shared with all clients from this domain. Take the rest as the training set.
3. For each domain, create a heterogeneous partition for M' clients. An M'-dimensional vector $q_c$ is drawn from a Dirichlet distribution for class c, and the training set of class c may be assigned to client m' proportionally to $q_c[m']$.
4. Record the class distributions $\mathcal{P}_m(y)$ of each client's training set.
5. For each client in each domain, assign the whole test set of this domain as $$\mathcal{D}_m^{test}$$

and adopt $\mathcal{P}_m(y)$ in the PA/BA evaluation in equation (9).

Figure 4:
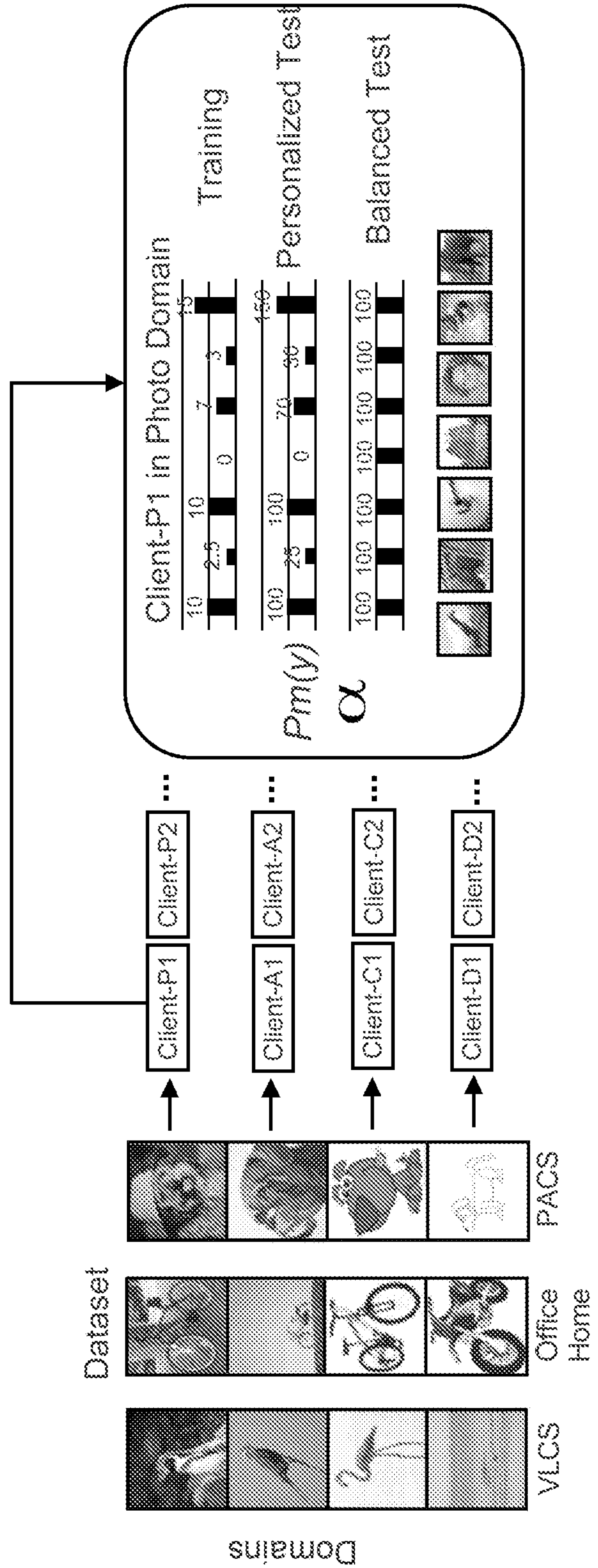
FIG. 4 provides a block diagram that illustrates a construction of federated personalized datasets according to various embodiments.

Examples. Three example object recognition datasets are considered, including PACS (7 classes for 10K images), VLCS (5 classes for 10K images), and Office-Home (65 classes for 15K images). FIG. 4 provides a block diagram that illustrates a construction of federated personalized datasets according to various embodiments. Each of the three constructed datasets includes each of the 4 domains and the image size is 224×224. Each domain is split with 70%/10%/20% for training/validation/test sets. For each domain, is subdivided over M'=10 clients with the class distributions either IID (i.e., class-balanced) or non-IID with Dirichlet (0.3). In total, there are M=40 clients in the experiments. Some other datasets that contain multiple domains are identified or collected at different locations using different cameras for future studies.

Example Methods

Figure 5:
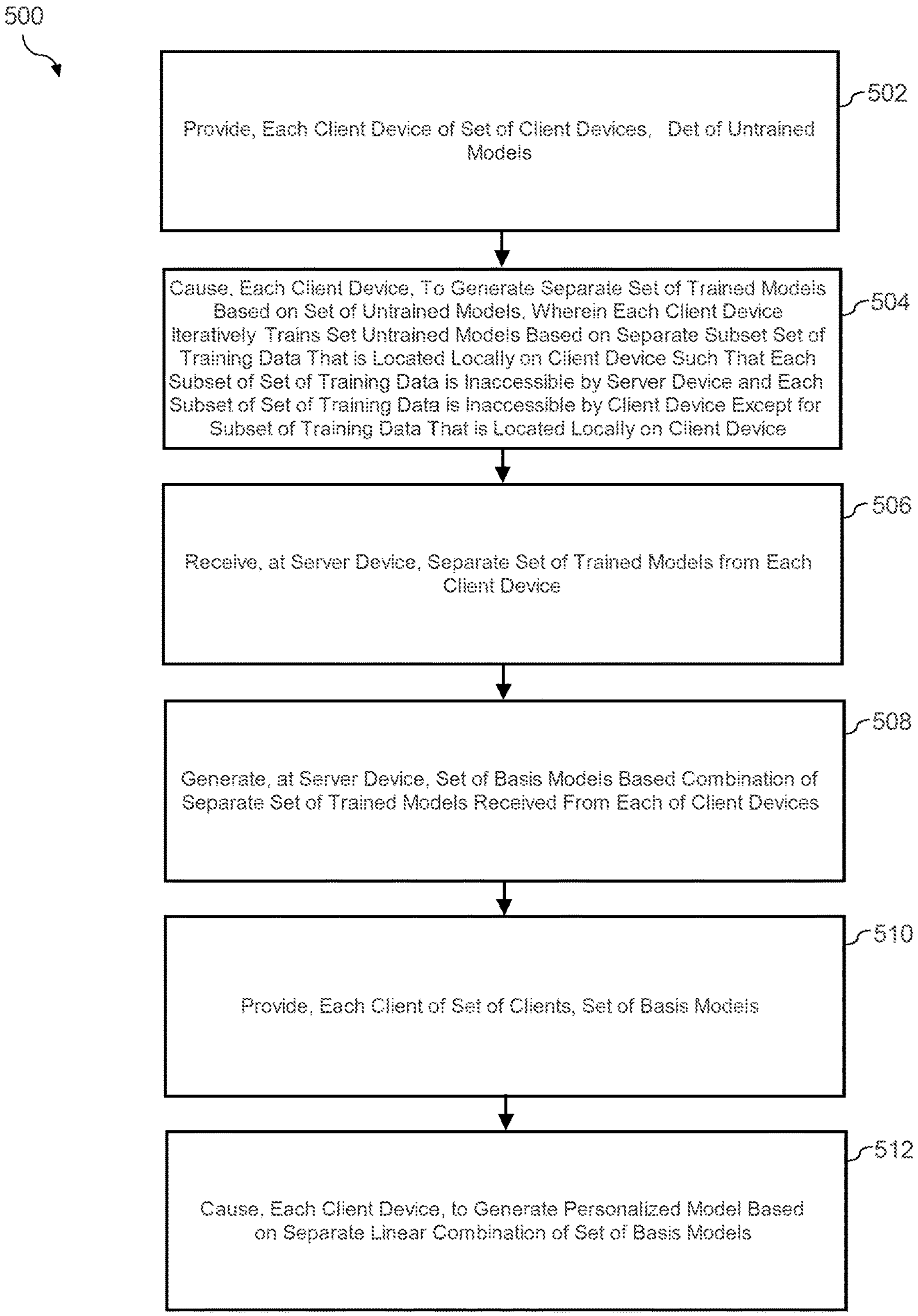
FIG. 5 depict a flowchart for a method for generating personalized federated learning models via sharable basis models, according to various embodiments Reference numerals that are repeated across plural figures are intended to identify the same features in various implementations.

FIG. 5 depict a flowchart for a method 500 for generating personalized federated learning (PFL) models via sharable basis models, according to various embodiments. Although the flowchart of FIG. 5 depicts steps performed in a particular order for purposes of illustration and discussion, the methods of the present disclosure are not limited to the particularly illustrated order or arrangement. Various steps of method 500 of FIG. 5 can be omitted, rearranged, combined, and/or adapted in various ways without deviating from the scope of the present disclosure. A computing device (e.g., any of the client devices of the set of client devices 110 of FIG. 1 and/or server device 102 of FIG. 1) or a combination of computing devices may perform at least a portion of the steps included in the flowchart of FIG. 5. Various software components and/or modules implemented by the computing devices (e.g., personalized basis model learner 130 of FIG. 1 and/or federated basis model learner 140 of FIG. 1) may implement at least a portion of the steps included in the flowchart of FIG. 5.

Method 500 begins at block 502, where a server devices provides a set of untrained models to each client device of a set of client devices. At block 504, the server devices may cause each client device of the set of client devices to generate a separate set of trained models based on the set of untrained models. Generating a set of trained models at a client device may include the client device iteratively training the set of untrained models based on a separate subset of a set of training data that is located locally on the client device. Each subset of the set of training data is inaccessible by the server device. Each subset of the set of training data is inaccessible by the client device except for the subset of training data that is located locally on the client device. At block 506, the server device may receive a separate set of trained models from each client device. At block 508, the server device may generate a set of basis models. The set of basis models may be based on a combination of the separate set of trained models received from each of the client devices. At block 510, the server device may provide the set of basis models to each client device of the set of client devices. At block 512, the server device may cause each client device of the set of client device to generate a personalized model based on a separate linear combination of the set of basis models.

In various embodiments, the method further includes causing, each client of the set of client devices, to iteratively generate a personalized vector while iteratively training the set of untrained models based on the separate subset of the set of training data. The personalized vector of a client device may indicate the separate linear combination of the set of basis models of the client device. The server device may cause, each client of the set of client devices, to generate the personalized model further based on the personalized vector of the client device and the set of basis models.

In some embodiments, each untrained model of the set of untrained models has an identical model architecture. Each untrained model of the set of untrained models may be an image classifier model. In such embodiments, the set of training data may include labeled images. The separate linear combination of the set of basis models for each client device of the set of client devices may be a convex combination of the set of basis models.

In various embodiments, iteratively training the set of untrained models at a client device of the set of client devices may include iteratively determining components of a personalized vector for the client device. Iteratively determining the components of the personalized vector may be based on the client device's separate subset of a set of training data and a loss function. The personalized vector for the client device may indicate the separate linear combination of the set of basis models for the client device. Parameters for each untrained model of the set of untrained models may be determined based on the client device's separate subset of a set of training data and the components of the personalized vector for the client. Iteratively determining components of the personalized vector for the client device may include setting a threshold value for each component of the personalized vector. For each iterative determination of each component of the personalized vector, a determined value of the component may be zeroed-out when the determined value of the component is less than the threshold value for the determined value of the component.

In various embodiments, iteratively training the set of untrained models at a client device of the set of client devices may include coordinating a first stochastic gradient descent (SGD) process for the set of untrained models and a second SGD process for a personalized vector for the client. Coordinating a first SGD process and a second SGD process may include holding constant components of the personalized vector while performing the first SGD process. Parameters of the set of untrained models may be held constant while performing the second SGD process. In at least one embodiments, the set of basis models may include a first subset of basis models and a second subset of basis models. The first subset of basis models may correspond to a feature extractor of the personalized model. The second subset of basis models may correspond to a classification head of the personalized model.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method implemented by a server device, the method comprising:

providing, each client device of a set of client devices, a set of untrained models;

causing, each client device of the set of client devices, to generate a separate set of trained models based on the set of untrained models, wherein each client device iteratively trains the set of untrained models based on a separate subset of a set of training data that is located locally on the client device such that each subset of the set of training data is inaccessible by the server device and each subset of the set of training data is inaccessible by the client device except for the subset of training data that is located locally on the client device;

receiving, at the server device, a separate set of trained models from each client device;

generating, at the server device, a set of basis models based on a combination of the separate set of trained models received from each of the client devices;

providing, each client of the set of clients, the set of basis models; and causing, each client device of the set of client devices, to generate a personalized model based on a separate linear combination of the basis models of the set of basis models.

2. The method of claim 1, further comprising:

causing, each client of the set of client devices, to iteratively generate a personalized vector while iteratively training the set of untrained models based on the separate subset of the set of training data, wherein the personalized vector of a client device indicates the separate linear combination of the set of basis models of the client device; and causing, each client of the set of client devices, to generate the personalized model further based on the personalized vector of the client device and the set of basis models.

3. The method of claim 1, wherein each untrained model of the set of untrained models has an identical model architecture.

4. The method of claim 1, wherein each untrained model of the set of untrained models is an image classifier model and the set of training data includes labeled images.

5. The method of claim 1, wherein the separate linear combination of the set of basis models for each client device of the set of client devices is a convex combination of the set of basis models.

6. The method of claim 1, wherein iteratively training the set of untrained models at a client device of the set of client devices comprises:

iteratively determining components of a personalized vector for the client device based on the client device's separate subset of a set of training data and a loss function, wherein the personalized vector for the client device indicates the separate linear combination of the set of basis models for the client device; and iteratively determining parameters for each untrained model of the set of untrained models based on the client device's separate subset of a set of training data and the components of the personalized vector for the client.

7. The method of claim 6, wherein iteratively determining components of the personalized vector for the client device comprises:

setting a threshold value for each component of the personalized vector; and for each iterative determination of each component of the personalized vector, zeroing-out a determined value of the component when the determined value of the component is less than the threshold value for the determined value of the component.

8. The method of claim 1, wherein iteratively training the set of untrained models at a client device of the set of client devices comprises:

coordinating a first stochastic gradient descent (SGD) process for the set of untrained models and a second SGD process for a personalized vector for the client.

9. The method of claim 8, wherein coordinating a first SGD process and a second SGD process comprises:

while performing the first SGD process, holding constant components of the personalized vector; and while performing the second SGD process, holding constant parameters of the set of untrained models.

10. The method of claim 1, wherein the set of basis models includes a first subset of basis models and a second subset of basis models, the first subset of basis models corresponding to a feature extractor of the personalized model, and the second subset of basis models corresponding to a classification head of the personalized model.

11. A computing system comprising:

one or more processors; and one or more non-transitory computer-readable media that store instructions that when executed by the one or more processors, cause the computer system to perform operations comprising:

providing, each client device of a set of client devices, a set of untrained models;

causing, each client device of the set of client devices, to generate a separate set of trained models based on the set of untrained models, wherein each client device iteratively trains the set of untrained models based on a separate subset of a set of training data that is located locally on the client device such that each subset of the set of training data is inaccessible by the computing system and each subset of the set of training data is inaccessible by the client device except for the subset of training data that is located locally on the client device;

receiving, at the computing system, a separate set of trained models from each client device;

generating, at the computing system, a set of basis models based on a combination of the separate set of trained models received from each of the client devices;

providing, each client of the set of clients, the set of basis models; and causing, each client device of the set of client devices, to generate a personalized model based on a separate linear combination of the basis models of the set of basis models.

12. The system of claim 11, the operations further comprising:

causing, each client of the set of client devices, to iteratively generate a personalized vector while iteratively training the set of untrained models based on the separate subset of the set of training data, wherein the personalized vector of a client device indicates the separate linear combination of the set of basis models of the client device; and causing, each client of the set of client devices, to generate the personalized model further based on the personalized vector of the client device and the set of basis models.

13. The system of claim 11, wherein the separate linear combination of the set of basis models for each client device of the set of client devices is a convex combination of the set of basis models.

14. The system of claim 11, wherein iteratively training the set of untrained models at a client device of the set of client devices comprises:

iteratively determining components of a personalized vector for the client device based on the client device's separate subset of a set of training data and a loss function, wherein the personalized vector for the client device indicates the separate linear combination of the set of basis models for the client device; and iteratively determining parameters for each untrained model of the set of untrained models based on the client device's separate subset of a set of training data and the components of the personalized vector for the client.

15. The system of claim 14, wherein iteratively determining components of the personalized vector for the client device comprises:

setting a threshold value for each component of the personalized vector; and for each iterative determination of each component of the personalized vector, zeroing-out a determined value of the component when the determined value of the component is less than the threshold value for the determined value of the component.

16. The system of claim 11, wherein iteratively training the set of untrained models at a client device of the set of client devices comprises:

coordinating a first stochastic gradient descent (SGD) process for the set of untrained models and a second SGD process for a personalized vector for the client.

17. The system of claim 16, wherein coordinating a first SGD process and a second SGD process comprises:

while performing the first SGD process, holding constant components of the personalized vector; and while performing the second SGD process, holding constant parameters of the set of untrained models.

18. A method implemented by a server device, the method comprising:

receiving, at a server device, a separate set of trained models from each client device of a set of client devices, wherein each client device generates the separate set of trained models by iteratively training a set of untrained models based on a separate subset of a set of training data that is located locally on the client device such that each subset of the set of training data is inaccessible by the server device and each subset of the set of training data is inaccessible by the client device except for the subset of training data that is located locally on the client device;

generating, at the server device, a set of basis models based on a combination of the separate set of trained models received from each of the client devices; and providing, each client of the set of clients, the set of basis models.

19. The method of claim 18, further comprising:

causing, each client device of the set of client devices, to generate the separate set of trained models based on the set of untrained models and separate subset of the set of training data that is located locally on the client device; and causing, each client device of the set of client devices, to generate a personalized model based on a separate linear combination of the basis models of the set of basis models.

20. The method of claim 18, further comprising:

causing, each client of the set of client devices, to iteratively generate a personalized vector while iteratively training the set of untrained models based on the separate subset of the set of training data, wherein the personalized vector of a client device indicates the separate linear combination of the set of basis models of the client device; and causing, each client of the set of client devices, to generate the personalized model further based on the personalized vector of the client device and the set of basis models.

* * * * *